(12) United States Patent
Jurka

(10) Patent No.: US 10,206,835 B2
(45) Date of Patent: Feb. 19, 2019

(54) CONTROLLER OF SYSTEM FOR PROPELLING THE PATIENT SUPPORT

(71) Applicant: LINET SPOL. S.R.O., Slany (CZ)

(72) Inventor: Vladimir Jurka, Unhošt$^T$ (CZ)

(73) Assignee: Linet SPOL S.R.O., Slany (CZ)

( * ) Notice: Subject to any disclaimer, the term of this patent is extended or adjusted under 35 U.S.C. 154(b) by 0 days.

(21) Appl. No.: 15/026,115

(22) PCT Filed: Oct. 3, 2014

(86) PCT No.: PCT/CZ2014/000110
§ 371 (c)(1),
(2) Date: Mar. 30, 2016

(87) PCT Pub. No.: WO2015/048938
PCT Pub. Date: Apr. 9, 2015

(65) Prior Publication Data
US 2016/0242978 A1    Aug. 25, 2016

(30) Foreign Application Priority Data

Oct. 4, 2013 (CZ) .............................. PV 2013-775

(51) Int. Cl.
*A61G 7/00*  (2006.01)
*A61G 7/05*  (2006.01)
(Continued)

(52) U.S. Cl.
CPC ............. *A61G 7/05* (2013.01); *A61G 1/0268* (2013.01); *A61G 1/0275* (2013.01);
(Continued)

(58) Field of Classification Search
CPC ..................................................... A61G 7/00
(Continued)

(56) References Cited

U.S. PATENT DOCUMENTS 5,806,111 A    9/1998  Heimbrock et al.
6,330,926 B1  12/2001  Heimbrock et al.
(Continued)

FOREIGN PATENT DOCUMENTS

CA    2469462       12/2009
EP    2298263 B1    3/2011
(Continued)

OTHER PUBLICATIONS

WIPO, International Search Report, completed Jan. 30, 2015, in International Patent Application No. PCT/CZ2014/000110, filed on Oct. 3, 2014.

(Continued)

*Primary Examiner* — Fredrick C Conley
(74) *Attorney, Agent, or Firm* — Thedford I. Hitaffer; Hitaffer & Hitaffer, PLLC

(57) ABSTRACT

A bed for maintaining the patient in horizontal position includes a patient support, undercarriage provided with casters and a system for propelling the bed which includes a controller and a control panel both connected to a processor unit. The controller includes a touch sensor connected to the processing unit. An activation member is also connected to processor unit. The activation member is a part of the control panel and it serves to activate the system and to initialize the calibration process of the touch sensor. An essential condition for propelling the bed is activated touch sensor and concurrently any of the function buttons being pressed. The touch sensor is being recalibrated before every system initialization hence the control of the system for propelling the bed is safe for the patient and the propelling of the bed is comfortable and simple for the personnel.

8 Claims, 5 Drawing Sheets

(51) Int. Cl.
    *A61G 1/02*         (2006.01)
    *B60B 33/00*      (2006.01)

(52) U.S. Cl.
    CPC ......... *A61G 1/0287* (2013.01); *A61G 7/0528* (2016.11); *B60B 33/0092* (2013.01); *A61G 2203/30* (2013.01)

(58) Field of Classification Search
    USPC ................................................. 5/600, 81.1 R
    See application file for complete search history.

(56) References Cited

U.S. PATENT DOCUMENTS

| | | |
|---|---|---|
| 6,505,359 B2 | 1/2003 | Heimbrock et al. |
| 6,752,224 B2 | 6/2004 | Hopper et al. |
| 7,007,765 B2 | 3/2006 | Waters et al. |
| 7,090,041 B2 | 8/2006 | Vogel et al. |
| 2008/0141459 A1 | 6/2008 | Hamberg |
| 2009/0188731 A1* | 7/2009 | Zerhusen ................. A61G 7/05 180/19.3 |
| 2009/0222184 A1* | 9/2009 | Bhai ........................ A61G 7/08 701/70 |
| 2011/0015842 A1* | 1/2011 | Kume ................... B62B 5/0026 701/67 |
| 2011/0087416 A1 | 4/2011 | Patmore |

FOREIGN PATENT DOCUMENTS

| | | |
|---|---|---|
| EP | 2624106 A2 | 8/2013 |
| WO | 2009113009 A1 | 9/2009 |

OTHER PUBLICATIONS

WIPO, Written Opinion of the International Searching Authority, dated Dec. 22, 2014, in International Patent Application No. PCT/CZ2014/000102, filed on Sep. 17, 2014.

\* cited by examiner

CONTROLLER OF SYSTEM FOR PROPELLING THE PATIENT SUPPORT

CROSS-REFERENCE TO RELATED APPLICATIONS

This application, filed under 35 USC 371, is a United States National Stage Application of International Application No. PCT/CZ2014/000110, filed Oct. 3, 2014, which claims priority to CZ Application No. PV 2013-775, filed on Oct. 4, 2013, the disclosures of which are incorporated herein by reference.

TECHNICAL FIELD

The invention is related to a patient support for maintaining a patient in the horizontal position, for example a hospital patient support, nursing patient support, examination patient support, stretcher, etc. including a system for propelling the patient support in the form of a motorized wheel for handling the patient support in motorpowered movement, in manual movement and in braking mode. The motorized wheel is activated via control panel and the motorized wheel is controlled via a controller which includes a touch sensor. Using of a separate control panel is advantageous solution in terms of the safety of the patient and even for hospital personnel.

BACKGROUND ART

In hospital environments the transport of patients on a hospital patient support or of the hospital patient supports themselves is required. For this reason patient supports are fitted with a system of casters allowing handling. But the handling of heavy patient supports or patient supports with a patient can be physically uncomfortable. For this reason hospital patient supports are equipped with additional systems for propelling a patient support, for example in the form of a motorized wheel making patient support transport easier for hospital personnel. The aforementioned system constitutes a known state of art, for example according to U.S. Pat. No. 5,806,111, U.S. Pat. No. 6,505,359 or U.S. Pat. No. 7,090,041.

The motorized wheel is connected to the undercarriage and can be forced against the ground for the purposes of motorized movement or retracted into the undercarriage for the purposes of handling the patient support without engagement of motorized movement, as in patent application EP2298263.

One important element of the system for propelling a patent support is its control equipment. In one common embodiment, such as in the U.S. Pat. No. 6,330,926, the patient support is equipped with push bars having a mechanical switch by which the user activates the motorized movement of the patient support. Another of the alternatives according to U.S. Pat. No. 6,752,224 is the control of the drive system via push bars equipped with force sensors located between the push bars and the patient support. These sensors convert the force which arises, for example, through the movement of the push bars in the required direction of travel, to a signal controlling the patient support's movements. The push bars in the aforementioned patent can be equipped with a user presence detector, which is implemented, for example, using a force sensor. Alternatively, an air or liquid pressure sensor or capacity sensor can be used for this purpose.

Another known solution for propelling a patient support is implemented in the form of a motorized wheel capable of rotating around the vertical axis, using which the user can move the patient support in all directions. This solution is contained, for example, in patent application WO2009113009.

Motorized movement of a patient support entails danger in cases where the personnel stops controlling the patient support as a result of an accident or inattention. For these cases safety elements are included in the patient support control intended to brake the patient support. In this way the patient support is essentially braked for safety reasons in cases where the control of the patient support by the personnel is interrupted. So in U.S. Pat. No. 7,007,765 the patient support is braked by the friction of unpowered drive for propelling if the pressing of the mechanical switch is interrupted. One common means of braking a patient support is by shorting out the motor. Such a solution is described in patent CA2469462, for example. One problem of patient supports allowing motorized movement compared with conventional non-propelled patient supports is their more difficult manipulation in a tight space because the patient supports are often only capable of motorized movement in one or more directions and braking. Another shortcoming of patient supports with a motorized system is the necessity of drawing power from batteries even during a very small movement of the patient support. For systems in the known state of art it is not possible for the operator to make fine movements to a patient support using their own power if the main or another separate switch is not used, for disconnection of the shorting circuit of the motor or for activation of the clutch. For this reason it is very difficult for the user to switch from motorized movement to manual mode enabling the wheel to rotate freely.

The aim of the invention is to propose a solution for controlling the drive system of a hospital patient support providing for the hospital personnel safe and practical handling of the patient support in the motorized movement, manual movement and patient support braking modes. The proposed solution also provides more comfortable manipulation with the patient support. Safety of such a system is realized by pressing of two control buttons to activate the actuator and thus the activation of the system by the patient is prevented.

Another aim of the invention is to eliminate disadvantages of the system which requires pressing of the button and which is uncomfortable for the personnel in general and concurrently preserve high safety.

Another aim is to create such a concept using the capacity sensor which is power-saving. It means its power consumption is low, it includes standby mode for power saving and it provides safe solution of calibration.

SUMMARY OF THE INVENTION

Specified problems are solved by a bed for maintaining a patient in a horizontal position which includes a mattress platform, undercarriage with casters and system for propelling the bed. The system for propelling the bed includes processor unit which the controller and control panel are connected to. The controller includes touch sensor which has to be activated while the bed is intended to be propelled or while the bed is drivable in the mode of free rotation of the motorized wheel. Hence the touch sensor is used as one of the securing element to improve the safeness of bed propelling. The control panel includes activation member for activating the system for propelling the bed and concurrently for initialization of the calibration of the touch sensor. The control panel and the controller can be separate for improving the safety of the propelling the bed. In the preferred embodiment the controller and the control panel are placed at the same longitudinal side of the bed in reciprocal proximity.

The touch sensor is used as calibration sensor. An instruction for loading and saving capacitance value of the capacity sensor as the calibrating value is sent by the processor unit for activating of the activation member. The calibrating capacitance is compared with the actual capacitance by the processor unit and the sensor is recalibrated in the case the actual capacitance is lower than saved capacitance. All above mentioned mechanisms highly improve the safety and comfort for both the patient and the personnel while the bed is propelled. Control of the patient support equipped with the described system is simple for the personnel as well.

DETAILED DESCRIPTION OF THE DRAWINGS

Figure 1:
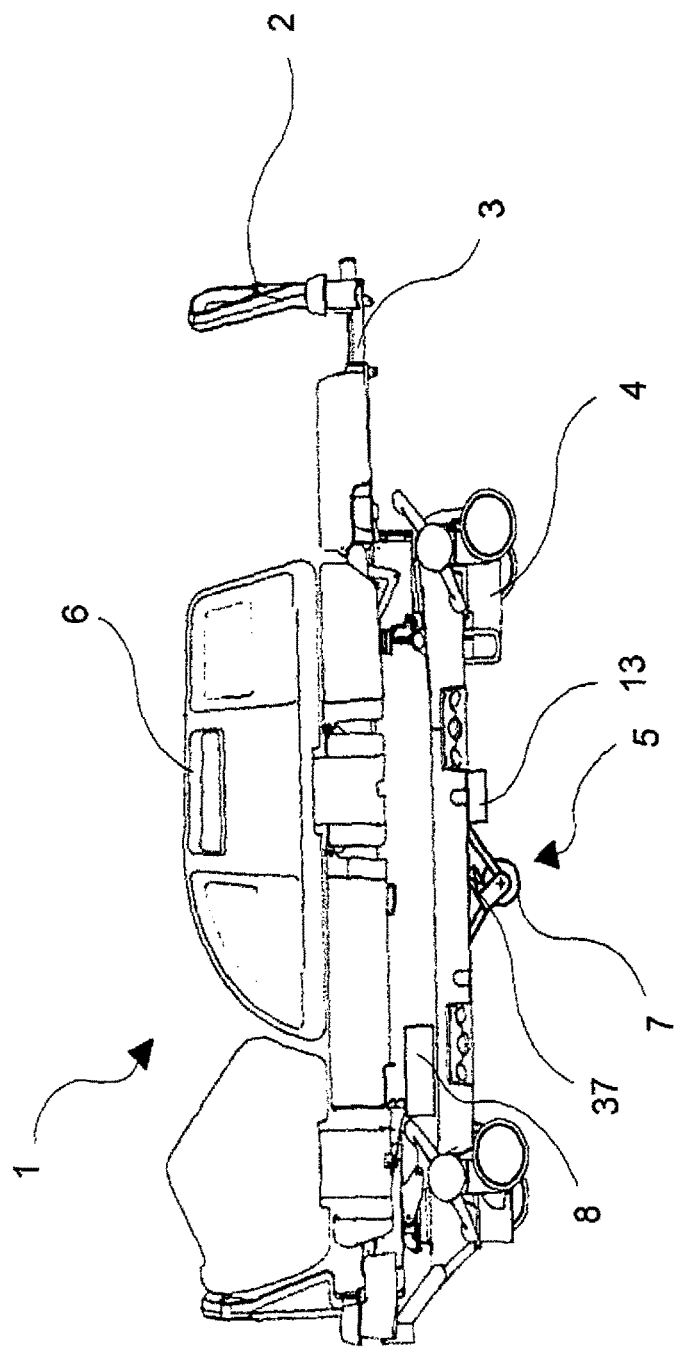
FIG. 1 shows a hospital patient support.
Figure 2:
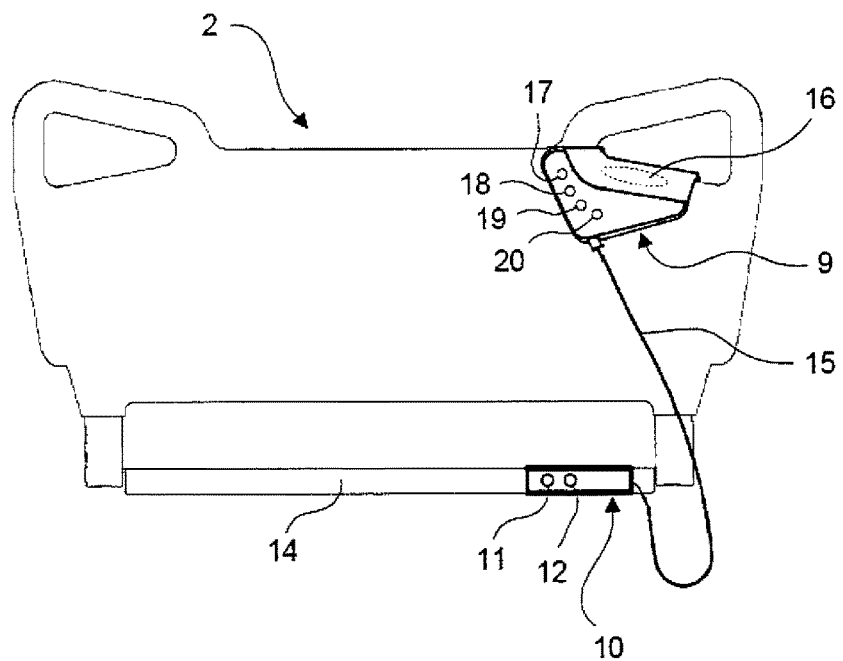
FIG. 2 shows the board of the hospital patient support which the controller is attached to and the control panel is coupled to the frame of the patient support.

FIG. 1 shows a bed 1 for maintaining the patient in the horizontal position such as, for example, a hospital patient support, nursing patient support, examination patient support, stretcher, etc., which includes removable end boards 2, a patient support 3, undercarriage with casters 4 and system for propelling the patient support 5. Sometimes it can also be equipped with side rails 6 and other accessories. The system for propelling the patient support 5 can include a motorized wheel 7, processor unit 8, drive for positioning the wheel, drive for propelling 37 the wheel, brake, controller 9 and control panel 10 with button for system activation 11 and button for lifting 12 of a motorized wheel 7, as can be seen in FIG. 2. The movement of the motorized wheel 7 between the upper and lower position is performed by means of a drive for positioning the wheel (not in the figure), whereas the drive for propelling 37 controls the movement of the bed 1 in different directions. This most often involves movement backwards and forwards, but from the state of the art it is known that the system for propelling the bed 1 may be designed so as to allow the motorized movement of the bed 1 in all directions. The motorized wheel 7 may function in three states, i.e., motorized movement, manual movement with free rotation of the wheel or in the braked state. A person ordinary skilled in the art can for this purpose select a suitable motorized wheel 7 with integrated drive for propelling 37 (for example HUB type) or wheel suitably connected to an external drive for propelling 37. This connection to the motor can also be implemented in such a way that the system includes a clutch or in an alternative solution, for example, the possibility of disconnection, using a switch or other device, of the battery 13 from the drive for propelling 37 which drives the motorized wheel. The drives are powered by the batteries 13 located near the system for propelling the patient support 5, for example on the frame 14 or on the undercarriage of the patient support 4. A person ordinary skilled in the art knows in which manner it is possible to connect the aforementioned drives functionally to the motorized wheel 7. The processor unit 8 of the motorized wheel 7 is located near the motorized wheel 7, for example fixed to the frame 14 or undercarriage 4 of the bed 1. The processor unit 8 of the motorized wheel 7 is connected via a control panel 8 to the controller 9 of the system for propelling the patient support 5, which is displayed in FIGS. 2 and 3. In a different embodiment the controller 9 is directly connected to the processor unit 8. The instructions the user gives by pressing one of the buttons 17, 18, 19, 20 on the controller 9 are processed by the processor unit 8, which, on the basis of their activation, controls one or both drives connected to the motorized wheel or the brake for the bed 1. A detailed description of the individual functions of the buttons 17, 18, 19, 20, 11, and 12 is described below. Alternatively, the drives and the activation of the system may also be controlled via the standard processor unit of the bed 1. The drive for positioning the wheel and the drive for propelling 37 are included amongst these drives. The motorized wheel 7 is located in the middle of the undercarriage 4 of the bed 1 so that the resultant handling of the bed 1 is as simple as possible. Another possible solution to the system for propelling the patient support 5 is the use of at least two motorized wheels 7, which are then located at the edge of the frame of the undercarriage 4. Another possible embodiment may consist of replacing the motorized wheel 7 with a motorized belt. The drive of the bed 1 may also be implemented by the replacement of one or more conventional mechanical wheels with a motorized wheel 7.

FIG. 2 shows the board 2 and frame 14 of the bed 1 from the operator's viewpoint. The controller 9 of the system for propelling the patient support 5 is located on the board 2, where it is hung. Alternatively, the processor unit 8 may be connected to the controller 9, which is connected or fixed to the bed 1. Such a controller 9 can be, for example, in the shape of a handrail connected as swinging around the axis of rotation on one of the frames 14 of the bed 1. In another embodiment the controller 9 can be part of the board 2 of the bed 1. The panel 10 includes an activation button 11 serving for activation of the system for propelling the patient support 5 and a button for lifting 12 the motorized wheel 7. In alternative embodiment the button 12 is not intended only for lifting the motorized wheel 7 but the entire system for propelling the patient support 5 is deactivated after lifting of the motorized wheel 7. Buttons 11 and 12 can be alternatively replaced by toggle switch in the same way as the standard controllers are. The deactivation occurs even automatically after long period of inactivity while any of the buttons 17, 18, 19 and 20 of the controller 9 are not used. The activation button 11 then has to be pressed again for reactivating the system for propelling the patient support 5. The activation button 11 is placed on the control panel 10. The control panel 10 is connected with the controller 9 via a wire and to improve the patient safety it is placed in sufficient distance out of the patient range. Important aspect of the invention is the location of the controller 10. The location is important not only for the patient safety since it is placed on the opposite side of the board 2 of the bed 1. Actually the location is also important in terms of the safety function of the touch sensor 16 which is capacity sensor. There is a necessity of weld calibrated sensor in case the capacity sensor is used. Correct calibration value s saved in the system which cooperates with the processor unit 8 of the system for propelling the patient support 5. In terms of energy saving the system is in stand-by mode if any action is not required. The correct calibration value is then deleted in stand-by mode. According to the invention the capacity sensor has to be calibrated precisely to enable the propelling mode and the free rotating mode of the motorized wheel 7. It is impossible to manufacture the sensor with preset calibration value which can be used for uninterrupted function regarding the fact the capacity sensor is a part of the controller 9 where the capacity sensor is placed in the gripping portion of the controller 9. Additionally some impurity can accumulate on the surface of the controller 9 which can subsequently influence the capacitance measured by the capacity sensor. For the safe function the sensitivity of the capacity sensor has to be set up repeatedly, ideally before every use of the sensor.

The calibration of the capacity sensor is performed always at the moment of activation of the system 5 by using the activation button 11 of the control panel 10. After activating of the control panel 10 the system 5 is activated and the motorized wheel 7 is lowered to the position where the motorized wheel 7 is in the contact with the floor. Concurrently at the same moment the processor unit 8 automatically saves the actual value of capacitance of the sensor to correctly determine the value when the hand of the personnel is not present on the controller 9 and hence the capacity sensor is not activated. After the calibration value is determined the personnel's hand detection can be processed and the functions of the propelling and free rotating mode of the motorized wheel 7 are enabled following the description below. According to above mentioned description it is clear that the personnel should not touch the controller 9 during the activating of the system 5 by activation button 11. Following this reason both the control panel 10 and even the activation button 11 are not a part of the controller 9. Location of the control panel 10 can be the same as in FIG. 2. FIG. 2 shows the control panel 10 attached to frame 14 of bed 1. The implementation of the invention requires the selection of such a location that activating of the activation button 11 and concurrently touching the controller 9 is not achievable by using only one hand. For application of this approach an ordinary expert skilled in the art of hospital patient supports is able to select another preferred location e.g. on the lower end of the board 2 or on the undercarriage 4. Preferably the control panel 10 is located at the same side of the bed 1 as the controller 9 is. Following this condition there is higher probability to intuitively use the same hand for activating the activation button 11 and afterwards for controlling the controller 9 and the chance of activating the activation button 11 by one hand while the second hand touches the controller 9 is eliminated.

In case the system 5 is activated in adverse condition while the personnel's hand touches the controller 9 the system contains secure corrective precautions for following function. At the beginning of the calibration the system 5 is not able to identify if the calibration was measured with hand touching the sensor. Regardless this fact the calibration value of the capacitance is saved by the system during the activation of the system 5. In case the personnel's hand touches the sensor, the capacitance value is greater than without touching the sensor. The value is saved by the system 5 in memory as an initial value. Personnel's hand still touches the controller 9 but the system 5 doesn't recognize this fact since the capacitance increase is not registered. The processor unit 8 evaluates the capacity sensor as not being activated by the personnel. It is necessary to stop touching the controller to let the controller 9 to be automatically recalibrated for activation of the system. Capacitance value decreases below the last set reference initial value after the hand is released out of the capacity sensor. In this case the system 5 detects a negative value, recalibrate the reference value regarding this negative value and the capacity sensor is recalibrated again at this time correctly without the hand touching the controller 9. From the personnel's point of view it is sufficient to release the hand of the controller 9 and touch it again. The safe mechanism which is also simple for the personnel is presented.

The controller 9 includes three buttons for movement of the bed 18, 19, 20, one button for braking the bed 17 and a touch sensor 16. The actual movement of the bed 1 via the system for propelling the patient support 5 has the advantage of being conditional on the activation of at least two control elements, these always being the touch sensor 16 and one of the three movement buttons 18, 19, 20. For example in FIG. 2 it is shown that the controller 9 is adapted for quick attachment to the board 2 due to its shape, or alternatively to the side rails 6 of the bed 1. The ergonomic shape of the controller 9 also allows a natural means of one-handed control, where the hand is placed on the touch detector 16, and at the same time it is also possible to comfortably control the four buttons mentioned 17, 18, 19, 20. There are shown the power status and the readiness of the patient support for being propelled in the panel by LED diodes 39. The number of the diodes 39 on the control panel 10 can be modified. There are four diodes 39 on the control panel 10 (see FIG. 3) in the embodiment according the invention. These diodes also serve for signaling failure status of the system 5 hence the system 5 suggests the failure to be repaired to the personnel or to the service technician. Regarding the number of the diodes 39 the maximum number of the failure statuses is limited; the number of failure statuses is always given by the combinations of the LED diodes 39. The combinations of the diodes 39 for all failure statuses are specified in the user's manual or in the service manual. The diodes 39 can warn e.g. mechanical failure, overload of the system, low battery etc. In a preferred embodiment the controller 9 can have a diode indicating a forbidden user function, for example if the user wants to start the operation of the bed 1 in spite of the fact that it is braked or plugged in the power supply. In another preferred embodiment the controller 9 includes the diode 39 for signaling the propelling of the bed 1.

Figure 3:
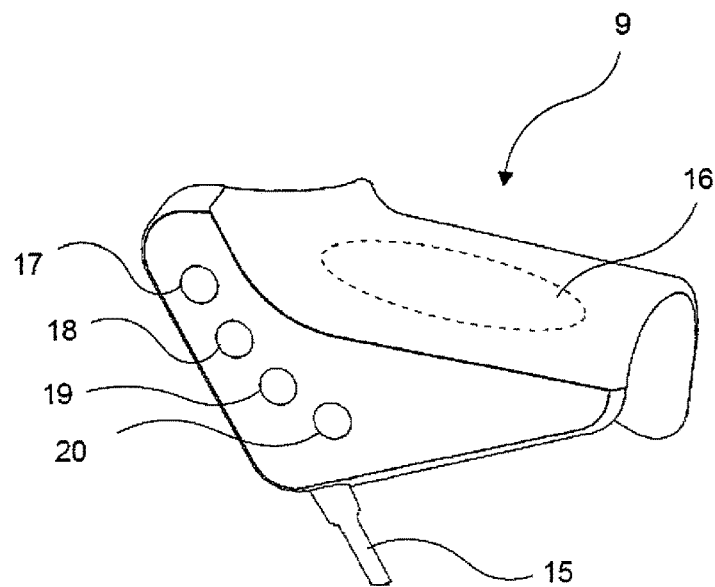
FIG. 3 shows a detailed view of the controller equipped with function buttons.

FIG. 3 shows a detailed view of the controller 9 of the system for propelling the patient support 5 including three buttons for movement of the bed 18, 19, 20, one button for braking the bed 17, and a touch sensor 16, which is in the form of a capacity sensor, for example. An alternative embodiment is to use another type of touch sensor 16, for example resistive, inductive, optical, using the technology of surface acoustic waves (SAW), using infrared radiation, a temperature sensor, etc. One of the embodiments for the ergonomic arrangement of the function buttons can be seen in FIG. 3 where a stop button for activation of the brake 17 is shown. The remaining three controls are for controlling the movement of the bed 1. These are a button for slow forward movement of the bed 18, button for fast forward movement of the bed 19, and button for slow reverse movement of the patient support 20. In another embodiment the controller 9 can have a larger number of buttons laid out otherwise which, in addition to the aforementioned functions, can serve for the sideways movement of the bed 1. Another solution of design of these buttons on the controller 17, 18, 19, 20 of the system for propelling the patient support 5 may be the implementation of other control elements, such as a joystick, touch sensor, user gesture sensor or other suitable control element. The functionality of the control buttons for movement 18, 19, 20 is conditional on the concurrent activation of the touch sensor 16, which means that the only button of the controller 9 not dependent on the activation of the touch sensor 16 is the button for activation of brake 17, which controls the brake on the system for propelling the patient support 5. During the regular operation of the bed 1, the system for propelling the patent support 5 is switched off and the brake is activated. In order for the bed 1 to start moving, for greater safety the system for propelling the patient support 5 can be switched on by pressing the activation button 11. For driving and releasing the brake the touch sensor 16 must be used at the same time as one of the direction of movement buttons 18, 19, 20. Using the motor for movement of the bed 1 forwards can be achieved by the concurrent activation of the touch sensor 16 and buttons for forward movement 18, 19, for which the user can select two speeds. Reverse movement can be attained by the concurrent activation of the touch sensor 16 and button for reverse movement 20. To stop the movement of the bed 1 the user can use the button for activation of brake 17, which is the only one independent of the concurrent activation of the touch sensor 16. In the case of smooth movement in one of the aforementioned directions, it is possible for the user to put the bed 1 into the manual mode with free rotation of motorized wheel by releasing the control button 18, 19, 20 for the designated direction of movement and at the same time holding down the touch sensor 16. If the bed 1 starts to move in a direction opposite to that of the last user command, the bed 1 is stopped by the brake. Detection of movement by the bed 1 in an opposite direction is achieved, for example, using a rotation sensor or by measuring the voltage generated by the motor. This mechanism prevents the bed 1 going off in a direction opposite to that given by the user command which is useful, for example on sloping terrain. One of the ways in which the bed 1 can be braked is by using an electromagnetic or electromechanical brake. An alternative way of stopping the bed 1 may be implemented by a brake via motor by shorting the power leads or simple regulation of the performance of the motor of the system for propelling the patient support 5, for example braking by pulse wave modulation (PWM). In an advantageous embedment a combination of all the aforementioned mechanisms can be used to attain the smooth braking of the bed 1, sufficient protection against unintended start of bed 1 movement or, for example, regulation of bed 1 speed when moving on sloping terrain.

Combination of these two braking mechanisms is suitable for immediate braking the bed 1 in situation when the user presses the button for this command or in case any failure occurs. A concurrently pressing of two control buttons is also evaluated as a failure or the personnel's fault and the command for immediate braking is executed.

Figure 5:
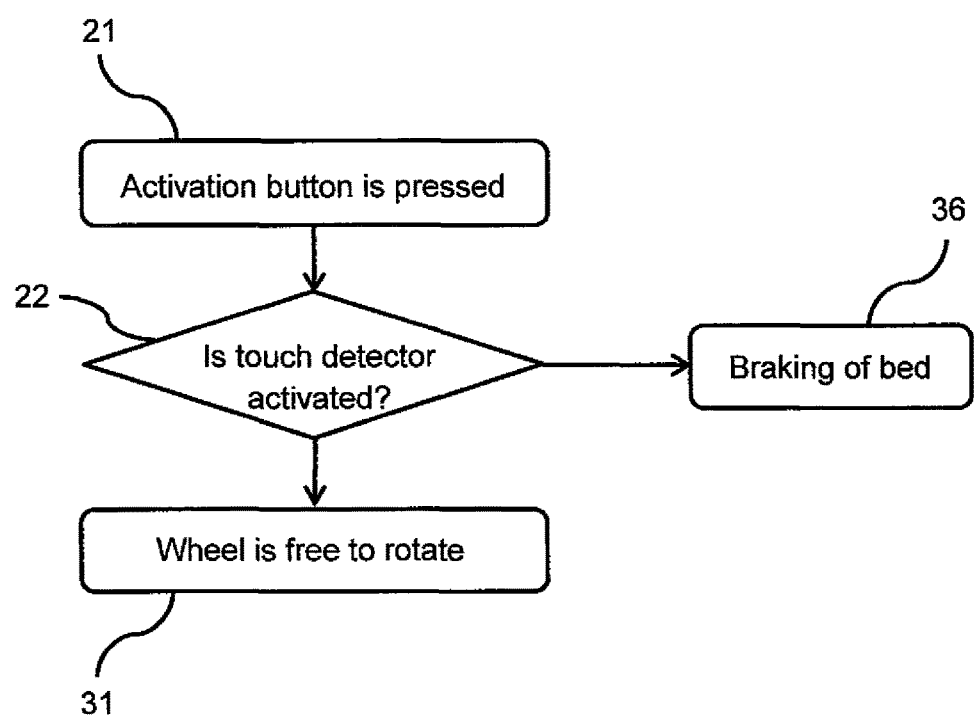
FIG. 5 shows an alternative embodiment of a simple algorithm allowing the patient support to be moved manually.

FIG. 5 shows a detailed diagram of the steps which the system for propelling the patient support 5 has to perform for the bed 1 to be permitted to provide motorized movement, manual mode, or for it to be braked. After the system is activated by pressing the activation button 11 in step 21 the system 5 is calibrated in such a way that processor unit 8 reads the actual value of capacitance of the capacity sensor 16 in step 38 to correctly determine the capacitance value when the personnel's hand is not in touch with the controller 9. In the following step 22 the processor unit examines the activity of the touch sensor 16. The patient support remains braked (step 36) if the processor unit 8 doesn't register the activating signal from the touch sensor 16. If the system is correctly calibrated and the touch sensor 16 is activated, in step 23 the processor unit 8 evaluates whether the user had pressed any of the movement buttons 18, 19, 20. If no pressing of any movement button 18, 19, 20 is detected, the bed is still braked (step 36). If the user presses one of the movement buttons 18, 19, 20, a signal is sent by processor unit 8 to the drive for propelling 37 to drive the bed 1 in the user-selected direction 24. It shows that for movement of the bed 1 the touch sensor 16 must be activated and the user must also press one of the buttons for a selected direction 18, 19, 20. The start of movement of the bed 1 after the pressing of one of the movement buttons 18, 19, 20 doesn't have to be immediate but the command may be implemented after some predetermined time delay configured in the processor unit 8. In the next step 25, the processor unit 8 evaluates whether the button for brake activation 17 is pressed. If so, the system proceeds to step 36, i.e. braking. Another possibility for braking is in the case when the user has pressed a button for movement 18, 19, 20 in a direction other than that last selected as it is described in step 26. It means that if during the movement of the bed the user presses a button for activation of the brake 17, or presses a movement button 18, 19, 20 for a direction other than previously selected, the bed 1 will continue to step 36, i.e. to the braking mode. If the selected button 18, 19, 20 is for the same direction as that originally selected the bell will continue in motion 27. In step 28 the processor unit 8 will evaluate whether the user is still holding down the active movement button 18, 19, 20 for the preselected direction. If so, and additionally in step 29 the processor unit 8 still evaluates the touch sensor 16 as activated, the bed 1 continues in motion. If the touch sensor 16 is not activated the bed 1 is braked (step 36). If the processor unit 8 evaluates that the user has released any of the movement buttons 18, 19, 20 for the pre-selected direction but is at the same time holding the touch sensor 16 activated (step 30), in step 31 the bed 1 proceeds to manual mode with free rotation of motorized wheel 7. If in the manual mode 31 the processor unit detects a pressed button for brake activation 17 in step 32, step 36 brakes the bed 1 which also happens when the processor unit 8 detects a change in the direction of movement of the bed 1 (step 33). If none of the conditions of steps 32 and 33 are met, the processor unit 8 evaluates whether the user has pressed one of the movement buttons 18, 19, 20. If the user has pressed button 18, 19, 20 for a direction (step 34) other than the one which the bed 1 was moving in the manual mode, the bed 1 is braked in step 36. If a movement button 18, 19, 20 is activated for the same direction in which the user was moving the bed 1 (step 35), the manual mode is terminated and the bed 1 returns to step 24, i.e. to motorized movement in the selected direction. If in step 34 and 35 the processor unit 8 does not detect any activated movement button 18, 19, 20, the bed 1 continues in the manual mode.

Figure 4A:
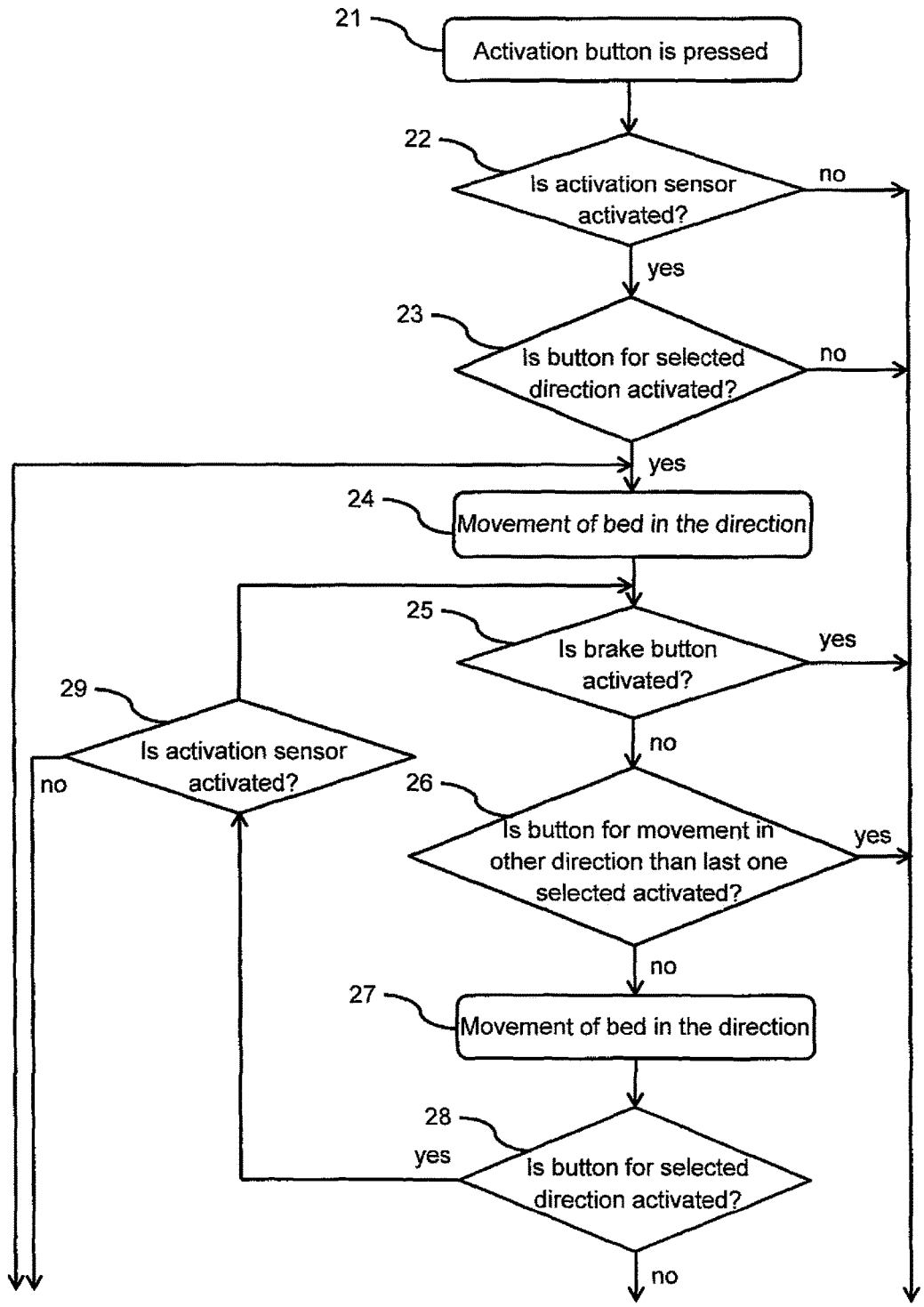
FIGS. 4a and 4b show a diagram of an algorithm for starting the movement of the patient support, for manual movement of the patient support with free rotation of the wheel and for braking mode.
Figure 4B:
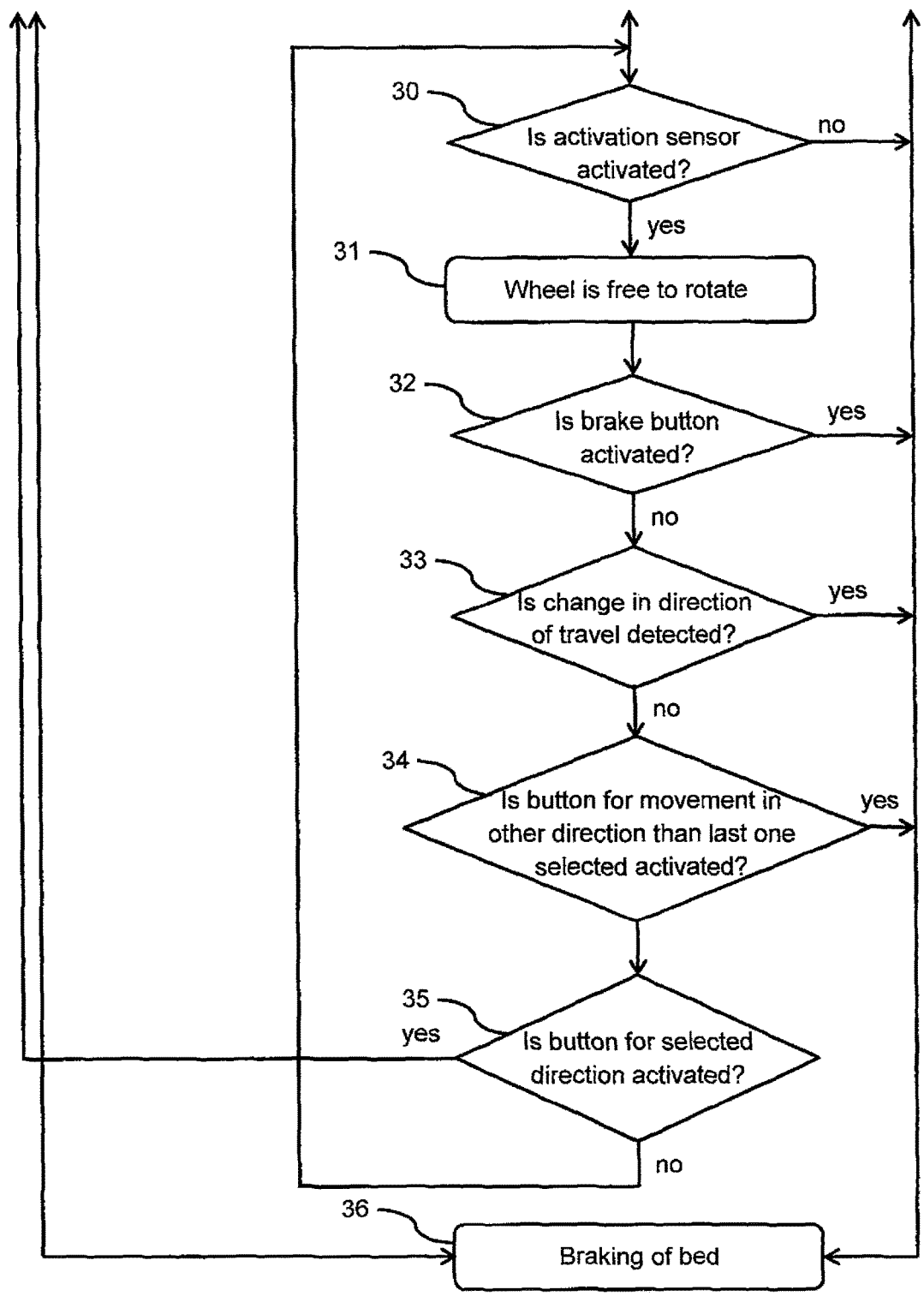

There is no reference to the vertical movement of the motorized wheel 7 in FIG. 4 but any ordinary expert skilled in the art knows in which manner it is possible to control and set the vertical movement of the motorized wheel 7 to be reliable and safe. The motorized wheel 7 is lowered to the position in contact with the ground after activating an activation button 11. The motorized wheel 7 is lifted after activating the activation button for lifting 12 or the system can be set up to lift the motorized wheel 7 after lapsing a predetermined period of time during which the system is not being used.

FIG. 5 shows an alternative embodiment of the simple algorithm for controlling the system to operate the wheel in mode of free rotational. The system is calibrated in step 38 as soon as the system for propelling the patient support 5 is activated in step 21 by pressing the button for activating the system. Afterwards in step 22 the system for propelling the patient support 5 examines if the touch sensor 16 is activated by a user. If the touch sensor 16 detects the user the mode of free rotation 31 is enabled. If the touch sensor is inactive the bed 1 is braked.

1 bed
2 board
3 patient support
4 undercarriage with casters
5 system for propelling the bed
6 side rails
7 motorized wheel
8 processor unit
9 controller
10 control panel
11 button for activation of system
12 button for lift
13 batteries
14 frame of bed
15 cable
16 touch sensor
17 button for activation of brake
18 slow forwards movement button
19 fast forwards movement button
20 slow reverse movement button
21-36 control algorithm steps
37 drive for propelling

The invention claimed is:

1. Patient support for maintaining a patient in a horizontal position, the patient support comprising a mattress platform, a chassis with wheels for supporting the patient support for movement on a supporting surface, and a system for propelling the patient support, the patient support further comprising a processor unit connected to a controller and a control panel, wherein the controller includes a capacity sensor for controlling movement of the patient support in response to user contact with the capacity sensor, the control panel includes an activation member connected to the processor unit, the activation member initializes a calibrating process of the capacity sensor, wherein an actual value of a capacitance of the capacity sensor is determined by the processor unit to be a calibration value of the sensor.

2. Patient support according to claim 1 wherein the controller and the control panel are separated so that a patient on the patient support is unable to concurrently operate both the controller and the control panel.

3. Patient support according to claim 2 wherein the controller and the control panel are at the same longitudinal side of the patient support.

4. Patient support according to claim 1 wherein the capacity sensor is connected to the processor unit for disabling an electromagnetic brake.

5. Patient support according to claim 1 wherein the capacity sensor is connected to the processor unit for enabling free rotation of a motorized wheel.

6. Patient support according to claim 1 wherein saving of the capacitance value of the capacity sensor as the calibration value is initialized by the activation member.

7. Patient support according to claim 1 wherein the actual value of capacitance and the calibrating value of capacitance are compared by the processor unit.

8. Patient support according to claim 7 wherein the processor unit includes a circuit for recalibrating of an initial calibration value.

* * * * *